G. E. FRIESEN.
SPRING WHEEL.
APPLICATION FILED APR. 14, 1909.
970,486.
Patented Sept. 20, 1910.
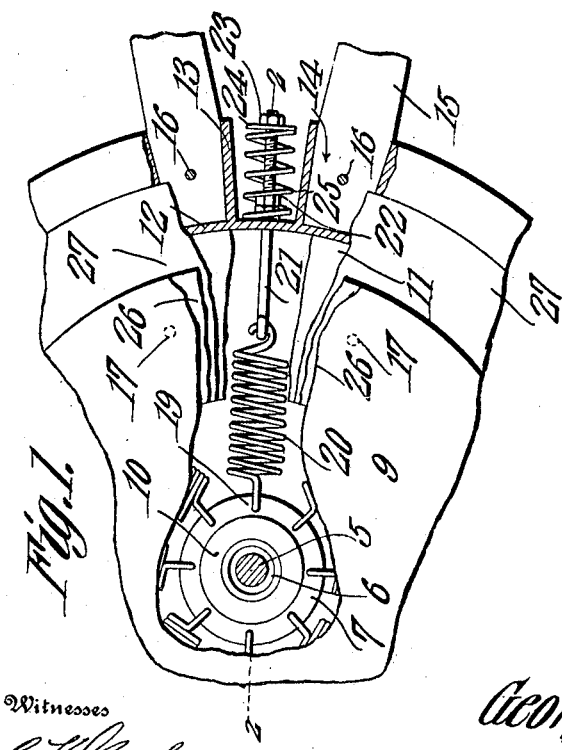
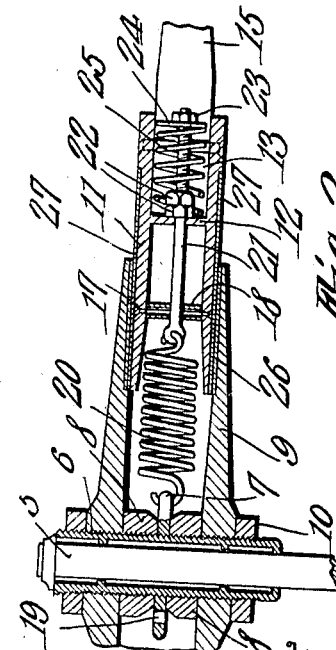
Witnesses
Inventor
George E. Friesen.
By C. A. Snow & Co.
Attorneys

UNITED STATES PATENT OFFICE.

GEORGE E. FRIESEN, OF NORTH YAKIMA, WASHINGTON.

SPRING-WHEEL.

970,486.  Specification of Letters Patent.  Patented Sept. 20, 1910.

Application filed April 14, 1909. Serial No. 489,831.

*To all whom it may concern:*

Be it known that I, GEORGE E. FRIESEN, a citizen of the United States, residing at North Yakima, in the county of Yakima and State of Washington, have invented a new and useful Spring-Wheel, of which the following is a specification.

The present invention aims to improve generally the construction of spring or resilient vehicle wheels and incidentally to so construct the wheels as to exclude dust and dirt from the cushioning elements thereof.

The invention further aims to provide means for automatically taking up the slack of the cushioning springs or other elements of the wheel whereby to render the wheel yieldable in the same manner as if the ordinary pneumatic tires were employed.

In the drawings, there are shown two embodiments of the invention and of the figures of the drawings, Figure 1 is a side elevation parts being broken away and parts being shown in section, of one form or embodiment of the invention. Fig. 2 is a horizontal sectional view on the line 2—2 of Fig. 1.

Referring more specifically to the drawings the numeral 5 indicates a wheel axle upon which is journaled a hub sleeve 6 which is exteriorly threaded as is clearly shown in Fig. 2 of the drawings, and upon which and medially located with respect to the ends thereof, is disposed a disk 7 held in place through the medium of nuts 8 which are threaded upon the sleeve from opposite ends thereof and confine the said disk between them. Also disposed upon the hub sleeve and located one beyond each of the disk securing nuts 8 are circular hub plates 9, these plates being held securely in position upon the sleeve by means of suitable nuts 10 which are threaded upon the sleeve, as in the case of the nuts 8, from the ends thereof and confine the said plates therebetween and the respective nuts 8.

It will be understood from an inspection of the drawings and from the foregoing description of the hub section of the wheel that the circular hub plates 9 are held in opposed relation and parallel with respect to each other.

In addition to the hub section of the wheel just described, the wheel embodies a spoke carrying section which is normally concentric with respect to the hub section and is yieldably supported with respect thereto, and this spoke carrying section just mentioned comprises side portions 11 which are annular in form and are connected in spaced parallel relation and concentric one with respect to the other by an integral web 12 which also is annular. In addition to being connected by the web 12, the side portions 11 are further connected through the medium of radial webs 13 forming pockets 14 in which are received the inner or butt ends of spokes 15, there being rivets or bolts 16 secured through the said side portions 11 and the said butt ends of the spokes 15 whereby to hold the spokes securely in the pockets 14. The side portions 11 are further connected through the medium of bolts or rivets 17 which pass through spacing sleeves 18, the points of engagement of these bolts or rivets 17 through the said side portions 11 being adjacent the inner peripheries of the said side portions.

The disk 7 is formed at points equi-distantly spaced and adjacent its periphery, with openings 19 through which are secured the inner ends of expansible springs 20, the outer ends of these springs being connected each to the inner end of a threaded stem 21 which extend radially from the hub of the wheel and through openings formed in the annular web 12 of the spoke carrying section of the wheel, there being an adjusting and a jam nut 22 threaded upon each stem 21 and bearing against the outer surface of the annular web 12, the nuts being held in this engagement with the web by reason of the tension exerted by the spring 20. Beyond the nuts 22 upon each stem 21 there is threaded upon the stem a nut 23 against which bears a washer 24, there being a compressible spring 25 engaged upon the stem and bearing at one end against the web 12 and at its outer end against the said washer 24.

It will be understood from the foregoing description of this form of the invention that there will be a certain slack in the lower ones of the springs 20 when weight is disposed upon the wheel owing to the expansion of the upper ones of the springs and that such slack will be automatically and effectually taken up through the medium of the springs 25 so that the springs 20 will not only be relieved of suddenly imposed forces tending to alternately expand and contract them but inasmuch as the slack is automatically taken up, the wheel will be effectually cushioned and will yield substantially in the manner of a pneumatic tired wheel.

It is preferable to provide in the opposed faces of the hub plates 9, inserts 26 of hardened metal and to provide similar inserts 27 in the outer faces of the side portions 11 of the spoke-carrying member of the wheel it being understood that these inserts effectually take up the wear incident to the frictional contact of the side portions 11 of the spoke carrying portion of the wheel with the opposing faces of the hub plates 9 of the hub section of the wheel.

What is claimed is—

1. In a wheel, normally concentric wheel sections, expansible springs connecting the sections, and slack absorbing compressible springs associated with the expansible springs.

2. In a wheel, normally concentric wheel sections, expansible springs each connected to one section, compressible springs carried by the other section, and a connecting means connected with the expansible springs and with the compressible springs, said means being adjustable to adjust the tension of said springs.

3. In a wheel, normally concentric wheel sections, expansible springs each connected to one section, compressible springs carried by the other section, a rod connected to each of the expansible springs and extending through the related compressible springs, a disk fitted upon the rod, and a nut threaded upon the rod and bearing against the disk to hold the same against one end of the compressible spring, the nut being adjustable upon the rod to adjust the tension of the springs.

In testimony that I claim the foregoing as my own, I have hereto affixed my signature in the presence of two witnesses.

GEORGE E. FRIESEN.

Witnesses:
R. E. HULL,
F. D. SACKETT.